(12) United States Patent
Wang et al.

(10) Patent No.: US 10,691,854 B1
(45) Date of Patent: Jun. 23, 2020

(54) GRAPH-BASED TIMING ANALYSIS TIMING CALIBRATION

(71) Applicant: Avatar Integrated Systems, Inc., Santa Clara, CA (US)

(72) Inventors: Chao-Yung Wang, Taipei (TW); Zhong Chen, San Jose, CA (US); Geng Bai, Fremont, CA (US); Ping-San Tzeng, Fremont, CA (US)

(73) Assignee: Avatar Integrated Systems, Inc., Santa Clara, CA (US)

( * ) Notice: Subject to any disclaimer, the term of this patent is extended or adjusted under 35 U.S.C. 154(b) by 0 days.

(21) Appl. No.: 16/231,311

(22) Filed: Dec. 21, 2018

Related U.S. Application Data

(60) Provisional application No. 62/760,354, filed on Nov. 13, 2018.

(51) Int. Cl.
    *G06F 30/3312* (2020.01)
    *G06F 30/327* (2020.01)
(52) U.S. Cl.
    CPC ........ *G06F 30/3312* (2020.01); *G06F 30/327* (2020.01)

(58) Field of Classification Search
    USPC .......................................................... 716/134
    See application file for complete search history.

(56) References Cited

U.S. PATENT DOCUMENTS

| | | | |
|---|---|---|---|
| 9,633,159 B1 * | 4/2017 | Parikh ..................... | G06F 30/39 |
| 2012/0131525 A1 * | 5/2012 | Oh ........................ | G06F 30/327 |
| | | | 716/108 |

* cited by examiner

*Primary Examiner* — Eric D Lee
(74) *Attorney, Agent, or Firm* — Van Pelt, Yi & James LLP

(57) ABSTRACT

A set of multi-corner multimode (MCMM) databases that correspond to a set of working scenarios are accessed. A full timing update on the set of MCMM databases, for the set of working scenarios, is applied. A graph based analysis (GBA) timing calibration is performed on the databases, for the set of working scenarios to obtain a set of GBA-calibrated databases. Multiphase optimizations on the set of GBA-calibrated databases are iteratively performed to generate a set of optimized databases, including: performing a phase-specific optimization on the set of GBA-calibrated database to obtain an improved set of databases, and recalibrating GBA timing on the set of improved databases prior to a next phase-specific optimization.

20 Claims, 8 Drawing Sheets

PBA Analysis:
• Separate Path Analysis for A-O and B-O Paths.
• AO = AOpba
• BO = BOpba GBA Analysis:
• Simplistic Worst Case Analysis Identical for all Paths.
• O=Max (AOpba, BOpba)

US 10,691,854 B1

GRAPH-BASED TIMING ANALYSIS TIMING CALIBRATION

CROSS REFERENCE TO OTHER APPLICATIONS

This application claims priority to U.S. Provisional Patent Application No. 62/760,354 entitled GBA TIMING CALIBRATION filed Nov. 13, 2018 which is incorporated herein by reference for all purposes.

BACKGROUND OF THE INVENTION

Timing analysis is an important verification step for modern integrated circuit design, as it provides assurance that a design remains consistent even with process variation and corresponding behavior change. Often a result in timing analysis verification indicates a failure in timing, requiring a redesign of the circuit. It is important that timing analysis be as accurate and as efficient as possible to improve circuit design and/or reduce computing power required, reduce electrical power required, reduce memory requirements, and reduce network bandwidth required.

BRIEF DESCRIPTION OF THE DRAWINGS

Various embodiments of the invention are disclosed in the following detailed description and the accompanying drawings.

DETAILED DESCRIPTION

Figure 1:
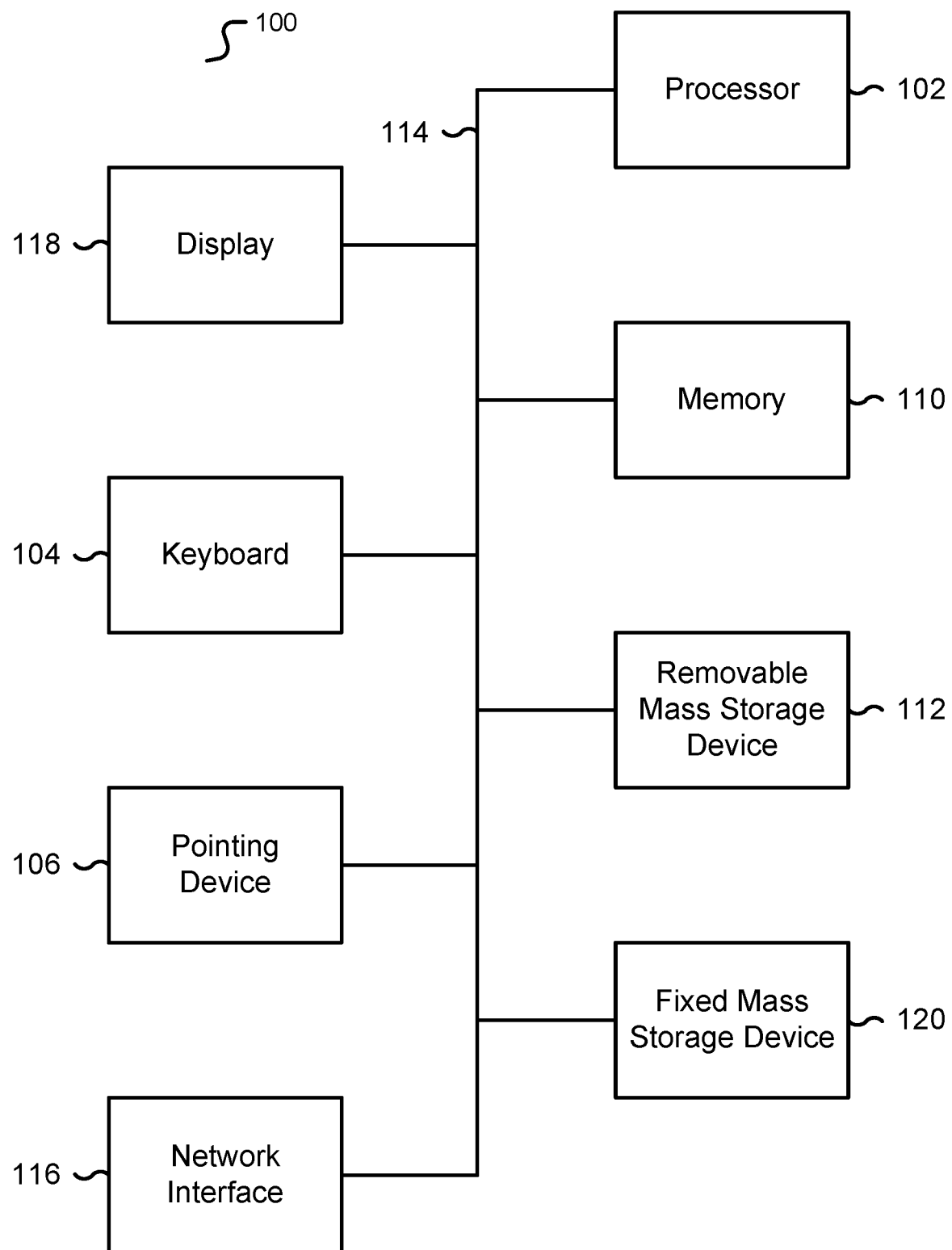
FIG. 1 is a functional diagram illustrating a programmed computer/server system for circuit design in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Path-Based Timing Analysis (PBA) is a more accurate and less pessimistic approach compared with Graph-Based Timing Analysis (GBA) for circuit design timing analysis. It is often attractive to use the PBA analysis approach for circuit optimization to improve circuit performance, improve circuit speed, reduce power consumption, and reduce chip area. These different phases of optimization are referred to herein as multiphase optimization.

One of the disadvantages of the PBA approach is its long analysis time especially when design has a plurality of violation (negative slack) paths. Besides long analysis time, there is another challenge when applying PBA to circuit optimization. Typically, a PBA database may only cover portions of the design, for example only the circuit components on negative slack paths. Thus, timing degradation of pins outside the PBA database may not be monitored by an incremental PBA update. This may introduce a timing jump such as a larger timing violation after an optimization move. This may happen during hold timing fix or power/area optimization stages for designs with multiple scenarios, such as those in multi-corner multi-mode (MCMM). In MCMM analysis, static timing analysis is performed over multiple modes (such as sleep mode, test mode, and functional modes) across different corners (voltage corner cases, temperature corner cases, and so on).

U.S. patent application Ser. No. 15/793,622, entitled CIRCUIT PLACE AND ROUTE OPTIMIZATION BASED ON PATH-BASED TIMING ANALYSIS filed Oct. 25, 2017 which is incorporated herein by reference for all purposes disclose a scenario dependent PBA-GBA hybrid analysis, described below as context.

Circuit design includes an iterative cycle between a first step of place and route automation and/or optimization and a second step of verification. Traditionally, static timing analysis (STA) is part of the second step of verification, using either graph-based timing analysis (GBA) or PBA; GBA is fast to perform but conservative while PBA is more accurate but slower to perform. U.S. patent application Ser. No. 15/793,622 describes incorporating PBA into the first step of place and route optimization enables designers to improve performance in their circuits with faster speed, lower power consumption and/or smaller area with little extra memory and/or CPU overhead. As discussed below, an incremental PBA analysis reduces elapsed time for a PBA flow run from the traditional 10× of the elapsed time for a GBA flow run to a practical ~2.8× of the elapsed time for a GBA flow run. Incremental PBA analysis may be embedded into general place and route tools for multiphase optimization including timing, power, and area optimization.

FIG. 1 is a functional diagram illustrating a programmed computer/server system for circuit design in accordance with some embodiments. As shown, FIG. 1 provides a functional diagram of a general purpose computer system programmed to provide circuit design in accordance with some embodiments. As will be apparent, other computer system architectures and configurations can be used for circuit design.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

STA is an important verification step for modern ASIC design. A designer uses STA to verify the expected timing behaviors of the circuit. Inside an STA engine, there are two basic approaches, GBA and PBA. GBA performs a linear traverse through the circuit graph and computes the worst timing results, or slack, at each endpoint in the circuit. The GBA approach is fast and provides conservative results compared to actual physical circuit operation behavior. By providing conservative results, the GBA engine may introduce pessimism into its final timing results. Such a conservative margin may become expensive for a designer, who may have to increase power consumption budgets, increase area, and/or reduce speed for a given design.

PBA analysis may be added in a timing verification step. PBA may be performed after GBA to remove unwanted pessimism. Starting from an endpoint with timing violation, or negative slack, a core PBA engine may extract a set of paths from GBA results in a non-increasing order of criticality and apply a timing update to each of these paths. The PBA result, or slack, for a specific path may typically be equal or better than the GBA result. Many paths with negative slack from a GBA become positive in the PBA domain, leaving more room for power and/or area optimization. The power and/or area optimization based on PBA results typically produce designs with smaller power consumption and smaller silicon area.

Figure 2A:
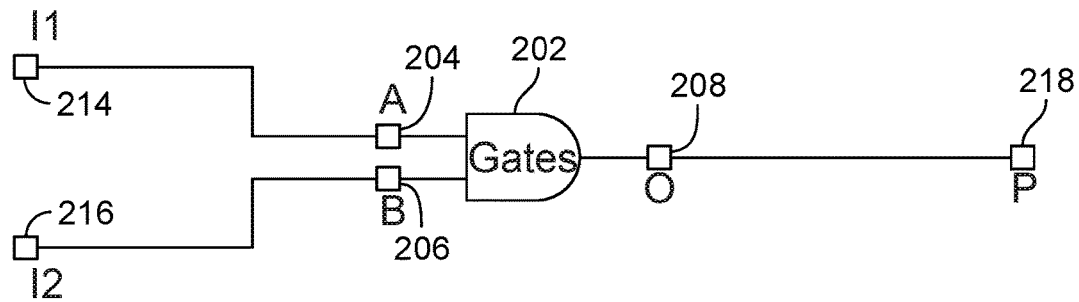
FIG. 2A is an illustration of a sample circuit and pin arrival times.
Figure 2A:
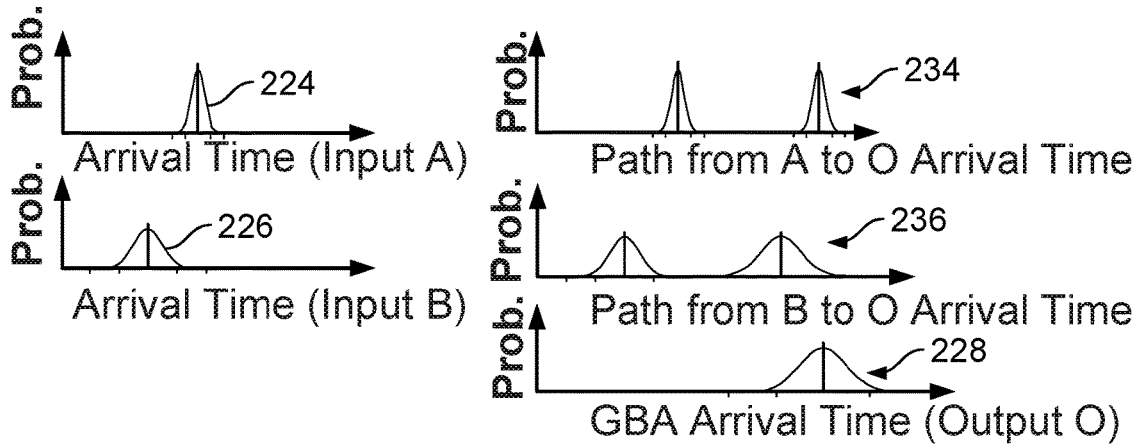

FIG. 2A is an illustration of a sample circuit and pin arrival times. FIG. 2A also illustrates an issue with GBA's conservative nature, wherein optimization may stall under certain situations.

Gate (202) has two input pins, A (204) and B (206) and output pin O (208). The pin I1 (214), for example from an output D-flipflop, is connected to input pin A (204), the pin I2 (216) is connected to input pin B (206) and pin P (218), for example to an input D-flipflop is connected to output pin O (208). During an arrival time update at instance/logic gate output pin O (208), the following two conditions may occur at the same instant:

The nominal arrival time at pin O (208) is primarily correlated with input A (204) and the corresponding edge delay from A to O, as shown in the input A arrival time pdf (probability density function) (224); and The arrival time variation at pin O (208) is primarily correlated with input B (206), as shown in the input B pdf (226).

Thus, the two output pin worst case arrival time attributes, nominal arrival time and arrival time variation, are correlated separately between the two input pins A and B. Under this situation, optimization may stall as the circuit has to be optimized from a plurality of sources simultaneously given simplistic information from the GBA, as shown in the GBA arrival time pdf (228).

By contrast, a PBA removes such pessimism from the GBA, wherein different paths are generated through different inputs, such as from A (204) to O (208), or from B (206) to O (208). As shown in FIG. 2A, the arrival time at output pin O (208) becomes a path specific attribute, with a path from A to O arrival time pdf (234) and a path from B to O arrival time pdf (236), instead of relying on the simplistic GBA arrival time pdf (228) for gates (202). Thus, the timing optimization based on PBA may produce a circuit with faster speed.

Traditionally, PBA and batch/snapshot mode PBA implementations have been used for verification. PBA results may also be applied earlier in design at circuit optimization. Circuit design techniques including the disclosed are used for example for incorporation in placement and routing systems, for example and without limitation in AVATAR Aprisa, SYNOPSYS IC Compiler II, and CADENCE Innovus.

Figure 2B:
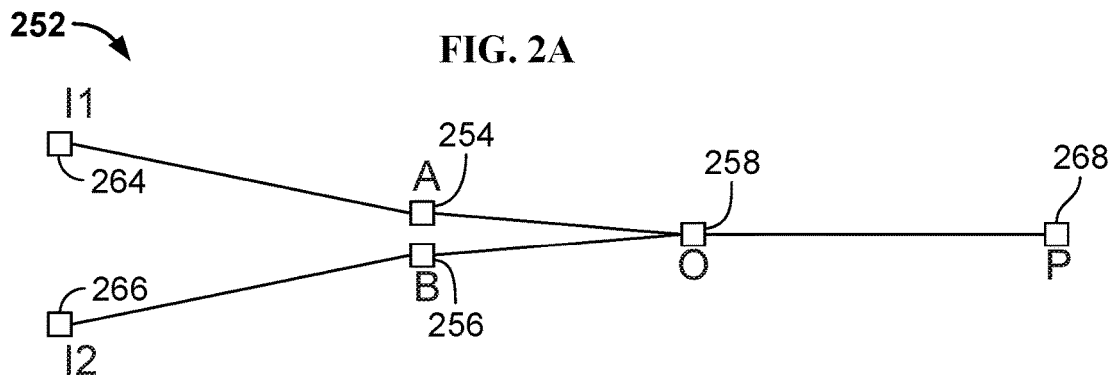
FIG. 2B is an illustration of a graph representation for the circuit in FIG. 2A.

FIG. 2B is an illustration of a graph representation for the circuit in FIG. 2A. In a GBA flow, the circuit (202) and net is abstracted into a graph structure (252). Each vertex in the graph (252) represents an instance pin in the design:
  Pin A (204) by vertex A (254);
  Pin B (206) by vertex B (256);
  Pin O (208) by vertex O (258);
  Pin I1 (214) by vertex I1 (264);
  Pin I2 (216) by vertex I2 (266); and
  Pin P (218) by vertex P (268).

The vertices in the graph are connected by edges. An edge can connect the input and output pins of the same instance, or logic gate. An edge may also connect the output of one instance to the input of another instance. For example, a PBA analysis grants separate path analysis for the A (254) to O (258) path and B (256) to O (258) path, denoted as an AOpba arrival time pdf for A-O and as a BOpba arrival time pdf for B-O. A GBA analysis may be thought of as a simplistic analysis being identical for all paths, thus O=max (AOpba, BOpba).

To provide an efficient PBA implementation for place and route optimization, an improved PBA database may be used. As referred to herein, the term database is any organized collection of data for processing, for example a data structure in memory such as a C++ class, a relational database, and/or a schemaless database. Besides using an existing GBA database, at least two fundamentals defined for the PBA database are a PBA path that describes a timing path, and a PBA pin describing a physical pin. Shown for example and without limitation as a C++ class:

```
class pbaPath {
  // describe one timing path including launch clock, cap-
     ture clock,
  // and data path
  . . .
};
and
class pbaPin {
  // represents one physical pin in PBA database, holding
     path specific
  // attributes for the pin, e.g. delay, transition, derate,
     arrival
  // time, etc. One physical pin may map to multiple pbaPins
     in
  // PBA database.
  . . .
};
```

In one embodiment, an example GBA database class includes a class for a GBA path report as well as a PBA analysis database, and a sample class definition is shown below without limitation:

```
// Top level class for GBA database
// GBA timing analysis manager for one scenario
class taMgr {
    dbScenario *_currScena;     // current scenario in timer
    taSDC * _sdc;               // Design constraint
    tdMgr *_td;                 // GBA graph traverse manager
    taPowAPI *_powAPI;          // Power analysis manager
    taSocvm* _socvm;            // Statistical timing analysis manager
    dbProject *_project;        // The current design, including netlist,
                                // parasitic RC information, and so forth.
// Clock tree analysis related class
    taCTSGenMap *_ctsGenMap;
    taCTSMarkMap *_ctsMarkMap;
// number of path groups
    UInt _pathGroupNum;
// Class for GBA path report
    taCritPathCtrl *_critPathCtrl;
// Multithread analysis manager
    taThreadMgr *_thrdMgr[utThread::MAX_THREAD];
    pbaTiming* _pba;            // PBA analysis database
};
```

In one embodiment, the PBA database includes the PBA path(s) and PBA pin(s), and a sample class definition is described without limitation as:

```
// Top level class for PBA data base
// Each scenario has one pbaTiming. It holds all PBA
// information for current scenario.
class pbaTiming {
    pbaMgr *_setup;             // PBA database for setup check
    pbaMgr* _hold;              // PBA database for hold check
};
// This is 1-line definition for pbaPath list structure used in class pbaMgr
typedef typedSList<pbaPath> pbaPathSList;
class pbaMgr {
    ta::DelayType _pbaType;     // defines setup or hold check
// Following group of parameters defines how the PBA paths are
collected from
// graph-based timing analysis results
    int _nworst;                // defines number of paths for each
                                // unique
                                // path ending register [Default 50]
    int _ maxPathPerGrp;        // max number of paths for each path
                                group
                                // [Default # of reg * _nworst]
    double _lowerSlackBound;    // path slack lower threshold,
                                // [Default negative infinite]
    double _upperSlackBound;    // path slack upper threshold
                                // [Default +100 ps]
    bool _unconstrPath;         // defines if PBA database includes
                                // unconstraint path, [Default false]
    bool _internalPathOnly;     // defines if PBA database only
                                // includes register-to-register path
                                // [Default false]
// Following is pbaPath list in current pbaMgr
    pbaPathSList* _pbaPathList; // for MT
};
// This is a 1-line definition for list of pbaPin, used by class pbaPath
typedef typedSList<pbaPin> pbaPinSList;
// Following class defines one PBA path
class pbaPath {
    pbaPinSList * _pbaDataList;     // Data path pbaPin list
    pbaPinSList * _pbaLaunchList;   // Launch clock pbaPin list
    pbaPinSList * _pbaCaptureList;  // capture clock pbapin list
// Incremental PBA analysis begin pin. Incremental PBA update starting
// from this pin.
    pbaPin* _incrBeginPin;
    taClock* _launchClk;            // Defines pbaPath clock informa-
                                        tion
    taClock* _captureClk;
// clock uncertainty for current pbaPath
    float _clkUncertain;            // [Default 0]
// CRPR (Clock Reconvergence Pessimism Removal) value for current
pbaPath
    float _crprVal;
// setup or hold constraint
    float _constraint;
// path PBA slack
    float _slack;
};
class pbaPin {
// The pbaPath current pbaPin associated with
    pbaPath *_path;
// The physical pin for current pbaPin
    dbPin *_pin;
// Float array hold pbaPin attributes on current pbaPath, including:
    // float _pbaTran;             // pbaPin transition
    // float _pbaDly;              // pbaPin delay
    // float _derate;              // pbaPIn nominal pbaPin derate
    // float _pbaDDly;             // PBA delta-delay
    // float _pbaDTran;            // PBA delta-tran
    // float _arrTime;             // pbaPin arrival time
    // float _reciTime;            // pbaPin require time
// Following variables for statistical timing analysis
    // float _sigmaRatio;
    // float _sigma;
    // float _arrTimeVar;          // arrival time variance
    float * _dataArr;
};
```

In each case, most data fields are calculated and filled in after a pbaPath analysis.

The PBA database includes a group of timing paths from GBA analysis. There are different methods to collect such paths. Parameters provided to control the paths to be included in the PBA database comprise:

Path slack thresholds, such as upper and lower bounds in time; and/or

The number of paths at each unique ending pin.

Figure 3A:
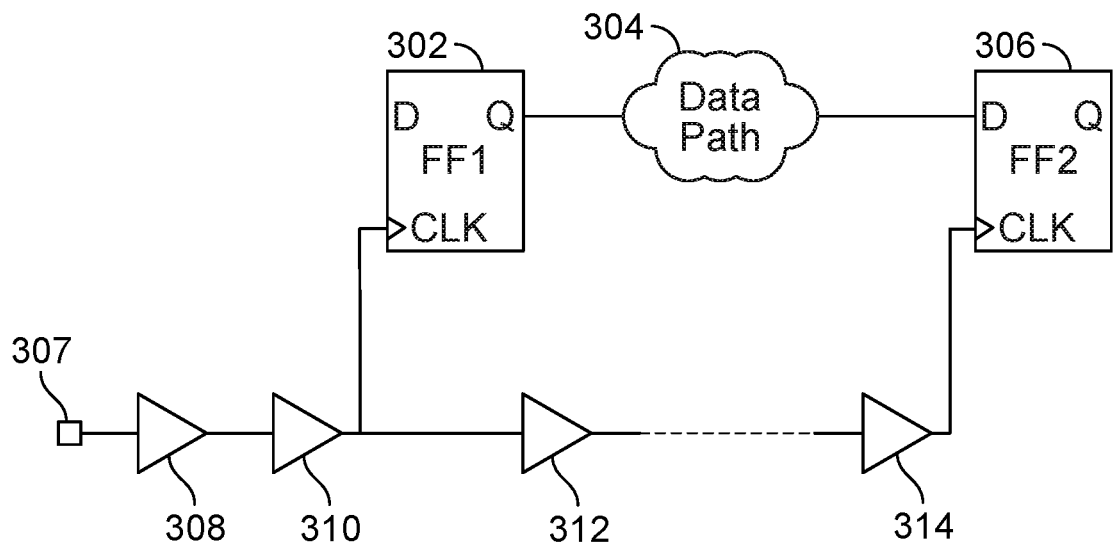
FIG. 3A is an illustration of an example timing path.

FIG. 3A is an illustration of an example timing path. FIG. 3A depicts two D-flipflops, FF1 (302) and FF2 (306), with data path/logic (304) connected between the Q output of FF1 (302) and D input of FF2 (306). The clock line including buffers (308), (310), (312), and (314), indicate various physical and virtual timing delays in the clock line from the boundary master clock pin (307).

Figure 3B:
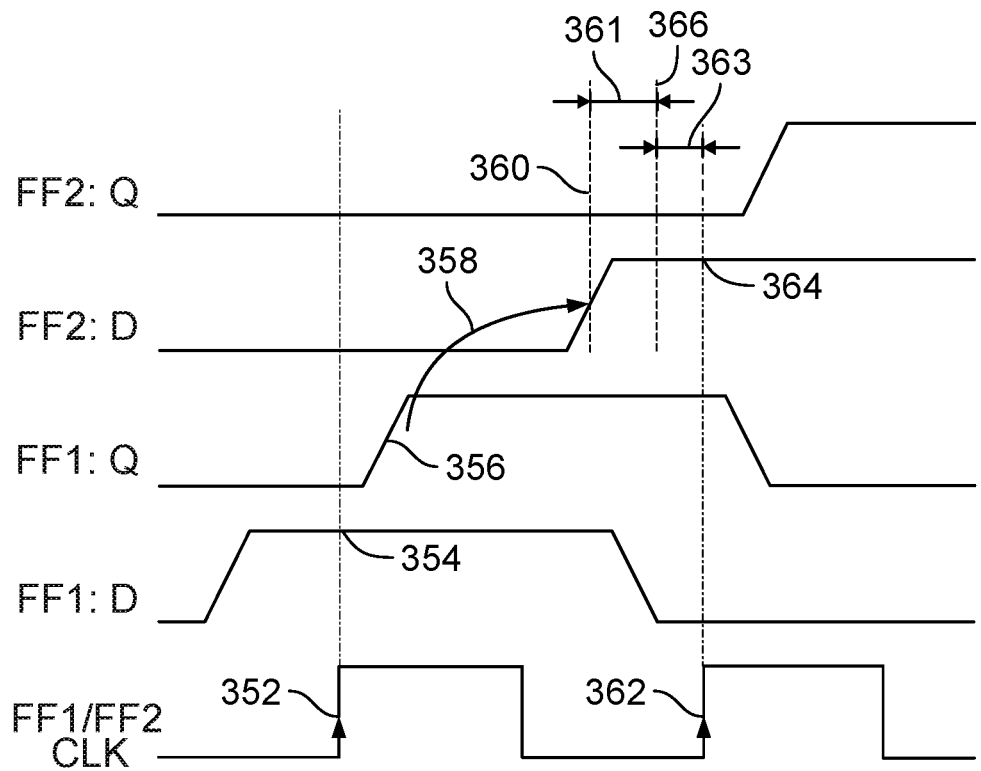
FIG. 3B is an illustration of a corresponding timing diagram for the timing path in FIG. 3A to illustrate STA concepts.

FIG. 3B is an illustration of a corresponding timing diagram for the timing path in FIG. 3A to illustrate STA concepts. To simplify the illustration, the CLK edge is shown in a single waveform, although they may be explained as local to the relevant D-flipflop. Clock launch edge (352) for the CLK of FF1 (302) triggers a data launch event (354) at FF1 (302), which has a non-zero delay (356) between the CLK of FF1 (302) and the Q output of FF1 (302). The launching clock as referred to herein includes the clock path from the master clock to the first register (302). The delay (358) of the data path (304) eventually asserts the D input of FF2 (306) at what is referred to herein as the arrival time (360). In relation to the clock capture edge (362) for the CLK of FF2 (306), FF2 requires what is referred to herein as the setup time period (363) to successfully settle a data capture event (364) at FF2 (306). The capture clock as referred to herein includes the clock path from the master clock to the capture register (306). The difference between the capture edge time (362) less the setup time period (363) is referred to herein as the required time (366). The time period between the required time (366) and arrival time (360) is referred herein as the slack (361).

Each pbaPath represents one specific timing path, and includes three components, wherein each component is described as a list of pbaPins:

pbaLaunchClockList: Starts from boundary master clock pin (307) and ends at launch register (302) CLK clock pin;

pbaDataPathList: Starts from launch register (302) CLK pin and ends at capture register (306) D input pin via the data path (304); and pbaCaptureClockList: Starts from boundary master clock pin (307) to capture register (306) CLK clock pin.

One physical pin in the design may be included by multiple pbaPins in the PBA database if there are multiple pbaPaths going through the same pin, for example a pin within the data path (304). From a PBA analysis, the same pin may have path specific values such as delay, transition, delta-delay, derate, and arrival time. These path specific attributes may be assigned to the pbaPin associated with the pbaPath.

Thus, all pbaPaths in PBA database may be independent with each other. The PBA analysis exploits a multithread programming technique to achieve highest possible processor thread efficiency.

In order to apply PBA results to guide circuit optimization efficiently, a "PBA incremental update" capability is used when a place and route optimizer makes changes to the design. The "incremental update" may collect a set of connected pins to form a window. Using such a "Quick PBA" to perform an analysis on the pins/paths associated with the window under the assumption that optimization may have lower impact outside the window may improve efficiency of circuit design. Using a simpler data structure for a PBA, without necessarily using a graph may improve efficiency of circuit design. The simpler data structure decreases analysis time while making it simple to do path addition, insertion, and deletion.

In one embodiment, a heap structure associated with a physical pin is created to address this. The PBA database is built during a PBA timing update for the whole design. A heap is a tree structure, wherein each vertex in the tree is a PBA path. The heap for a given physical pin holds all the pbaPaths that go through the given physical pin. In one embodiment, the heap is sorted such that the top of the tree is the path with the worst timing. In one embodiment, a heap sort algorithm is used for sorting. Using a heap data structure, the following operations may become more efficient:

Insert new pbaPath into heap;
Delete pbaPath from heap; and/or
Fetch worst slack pbaPath from heap for a worst negative slack (WNS)/total negative slack (TNS) update.

In one embodiment, the top of each heap for a pin is used to order the rest of the analysis and/or optimization.

PBA-GBA Hybrid Analysis.

Scenario dependent PBA-GBA hybrid analysis may be used for further efficiency. As described above, a PBA database may only cover a portion of the design.

PBA-GBA Hybrid Analysis for Hold Fix:

A scenario may have one well defined function mode and one parasitic corner. Under the assumption that a given design has one scenario A with a hold violation, the typical hold fix may slow down the path with the hold violation. If another scenario B has a PBA database that does not cover this path, the hold fix in scenario A may severely degrade a setup timing in scenario B.

One apparent solution addressing this problem is dynamically creating new setup paths to cover all the paths with a hold violation in the PBA database. This approach may reduce the possibility, but it may not fully prevent such a timing jump from happening. This type of solution consumes more memory and CPU time as more paths need to be analyzed.

By contrast, a scenario dependent PBA-GBA hybrid analysis may prevent such a timing jump problem with less memory and/or CPU overhead. Typical designs in a place and route flow contain multiple scenarios; some scenarios have large hold timing violation, and some have large setup violation. Before a hold timing fix stage, an analyzer may automatically select one scenario with a large setup violation coverage and mark the scenario as a hybrid scenario.

A PBA-GBA hybrid flow does not necessarily use a hybrid scenario GBA timing directly during an incremental PBA flow. After a whole design PBA analysis for each scenario, the analyzer may calculate worst PBA versus worst GBA slack differences at each path ending pin for each path group. It may then apply the differences as slack relax differences to each GBA timing path. This revised GBA timing may set identical WNS/TNS as its PBA results. The revised GBA timing in a hybrid scenario is only for a purpose of constraint, and may not be involved in optimization. Other normal scenarios still use the PBA timing to perform a timing fix. Optimization is still based on PBA timing results, while the hybrid scenario serves as a fallback/guard to prevent a timing jump caused by changes from an incremental PBA move.

If necessary, the analyzer may select multiple scenarios as hybrid scenarios. Alternately, if a system has more available memory, the analyzer may create an extra scenario to act as a hybrid scenario and keep all original scenarios as a normal scenario for PBA optimization. Such an analyzer may be embedded within a general place and route tool/implementation to prevent potential timing jump caused by incremental PBA optimization.

PBA-GBA Hybrid Analysis for Power/Area Optimization.

The optimization moves commonly used by multiphase optimization including power/area optimization are to size features down and/or swap to a high Vt cell. These moves typically slow down a circuit. A PBA database may not include all paths in a design. Some non-critical path initial positive slacks may become negative during a PBA power/area stage. By itself, an incremental PBA analysis may not catch such degradation as these paths are not included in the PBA database. The PBA-GBA hybrid analysis may thus be adopted during a PBA power/area optimization to prevent timing jumps.

Before circuit optimization, a tool may automatically select and/or create an extra scenario as hybrid. A tool may also select more than one scenario as hybrid. During circuit optimization, the hybrid scenario GBA timing may be incrementally updated together with another scenario PBA incremental update. The hybrid scenario GBA timing change, particularly for the portion out of PBA database, may serve as a constraint to prevent timing jump during PBA driven circuit optimization.

Figure 4:
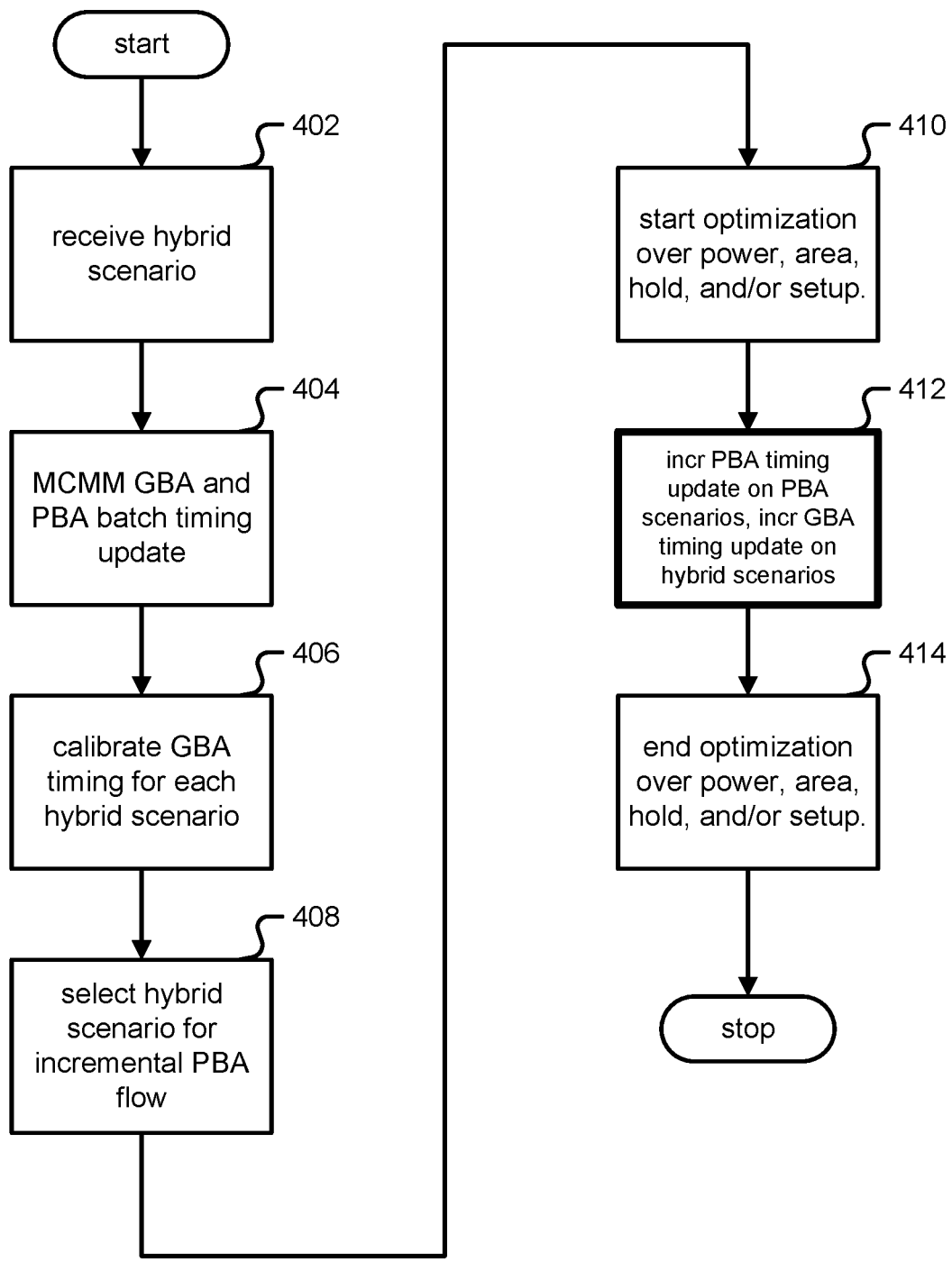
FIG. 4 is a flow chart illustrating a process for a traditional PBA-GBA hybrid analysis.

FIG. 4 is a flow chart illustrating a process for a traditional PBA-GBA hybrid analysis. The process depicted in FIG. 4 may be performed by a system such as that shown in FIG. 1.

In step 402, one or more scenarios are selected and/or received as hybrid. As described above, a hybrid scenario is a scenario selected as prone to a timing jump after an optimizer move, for example with multiple modes such as a functional mode and/or sleep mode. In step 404, an MCMM GBA and PBA batch timing update is performed as the baseline.

In step 406, as described above the PBA optimization flow does not use GBA timing directly. For each unique path ending pin per path group, simple slack difference is calculated as:

simple_slack_difference=worst_pba_slack−worst_gba_slack (5)

Simple slack difference is applied to "calibrate" GBA timing for all scenarios. After this calibration, the initial GBA timing WNS and/or TNS are set to their associated PBA timing results. In step 408, for the one or more scenarios selected as hybrid, calibrated GBA timing is checked for incremental PBA optimization flow to prevent timing degradation.

In step 410, a traditional optimizer is started for power, area, setup and/or hold timing. In step 412 during optimization, hybrid scenario(s) GBA timing may be incrementally updated using a GBA engine, in part by using a set of connected pins forming a window. Similarly, other scenario(s) PBA timing may be incrementally updated using a PBA engine. Afterwards, step 414 indicates the end of the optimizer phase, wherein results may be used to commit an optimization move in the event there is a slack improvement, for example.

Both PBA and/or hybrid scenarios have better timing during optimization compared to a traditional GBA flow, thus using a hybrid approach guarantees the PBA flow to produce better final quality of results than a regular GBA optimization flow.

However, a PBA-GBA hybrid flow may have limitation in practical usage. Runtime and memory requirements in some designs may grow explosively when adding multiple hybrid scenarios and/or updating a large amount of PBA paths during an optimization process. Moreover, analysis shows that quality of results (QoR) may be further improved if a more accurate timing calibration model is used and/or with full design coverage. In order to achieve the above goal, a revised PBA-GBA hybrid flow may be useful. GBA timing calibration in a revised hybrid flow is disclosed. GBA timing results after this calibration, for example worst negative slack (WNS) and total negative slack (TNS), may provide excellent match with PBA results.

Revised PBA-GBA Hybrid Flow using GBA Timing Calibration.

Improving upon simple_slack_difference, an arrival time offset concept to calibrate GBA timing is disclosed. One goal is to use calibrated GBA timing to obtain timing similar to PBA timing. Such GBA timing may be used by a hybrid scenario for constraint purposes and/or to prevent timing jump. In the revised PBA-GBA hybrid flow, such GBA timing may even be accurate enough to directly drive optimization.

Figure 5A:
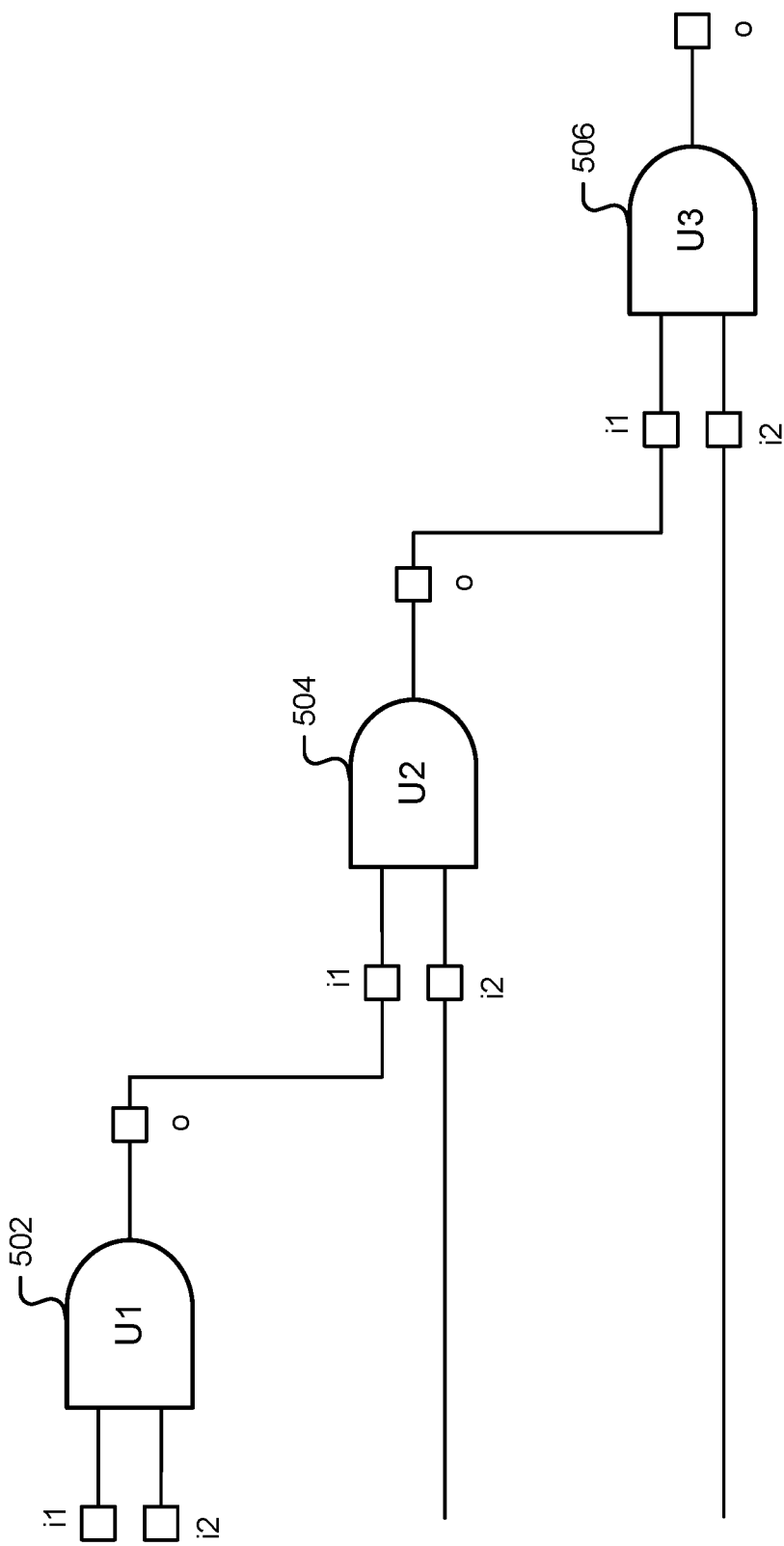
FIG. 5A is a block diagram illustrating an example of a simple combinational circuit.

FIG. 5A is a block diagram illustrating an example of a simple combinational circuit. The example of FIG. 5A demonstrates calibrated GBA timing analysis parameters that improves upon simple_slack_difference. In FIG. 5A, logic gate U1 (502) is in series with logic gate U2 (504), which in turn is in series with logic gate U3 (506). Each of the gates (502, 504, 506) shown in FIG. 5A have two input pins i1 and i2, and one output pin o. The input pin i1 for gate Ux is denoted herein as Ux/i1.

Thus for the circuit in FIG. 5A, the PBA and GBA delay values from U1/i1 to U2/i1 are:

PbaDelay(U1/i1→U2/i1)=PbaArrTime(U2/i1)−PbaArrTime(U1/i1) (1)

GbaDelay(U1/i1→U2/i1)=GbaArrTime(U2/i1)−GbaArrTime(U1/i1) (2)

Arrival time offset is defined herein as the arrival time difference between PBA and GBA from driver input pin to sink pin of a net connecting to driver:

ArrTimeOffset(U1/i1→U2/i1→U2/i1)=PbaDelay(U1/i1→U2/i1)−GbaDelay(U1/i1→U2/i1)=(PbaArrTime(U2/i1)−PbaArrTime(U1/i1))−(GbaArrTime(U2/i1)−GbaArrTime(U1/i1))= (PbaArrTime(U2/i1)−GbaArrTime(U2/i1))− (PbaArrTime(U1/i1)−GbaArrTime(U1/i1)) (3)

Since there may be many PBA paths through U2/i1, the PBA path with the worst slack may be selected and this PBA path may be used to calculate arrival time offset. Assuming the most critical PBA path on U2/i1 is from U1/i1, the arrival time offset on U2/i1 may be calculated as:

ArrTimeOffset(U2/i1)=(PbaArrTime(U2/i1)−GbaArrTime(U2/i1))−(PbaArrTime(U1/i1)−GbaArrTime(U1/i1)) (4)

Figure 5B:
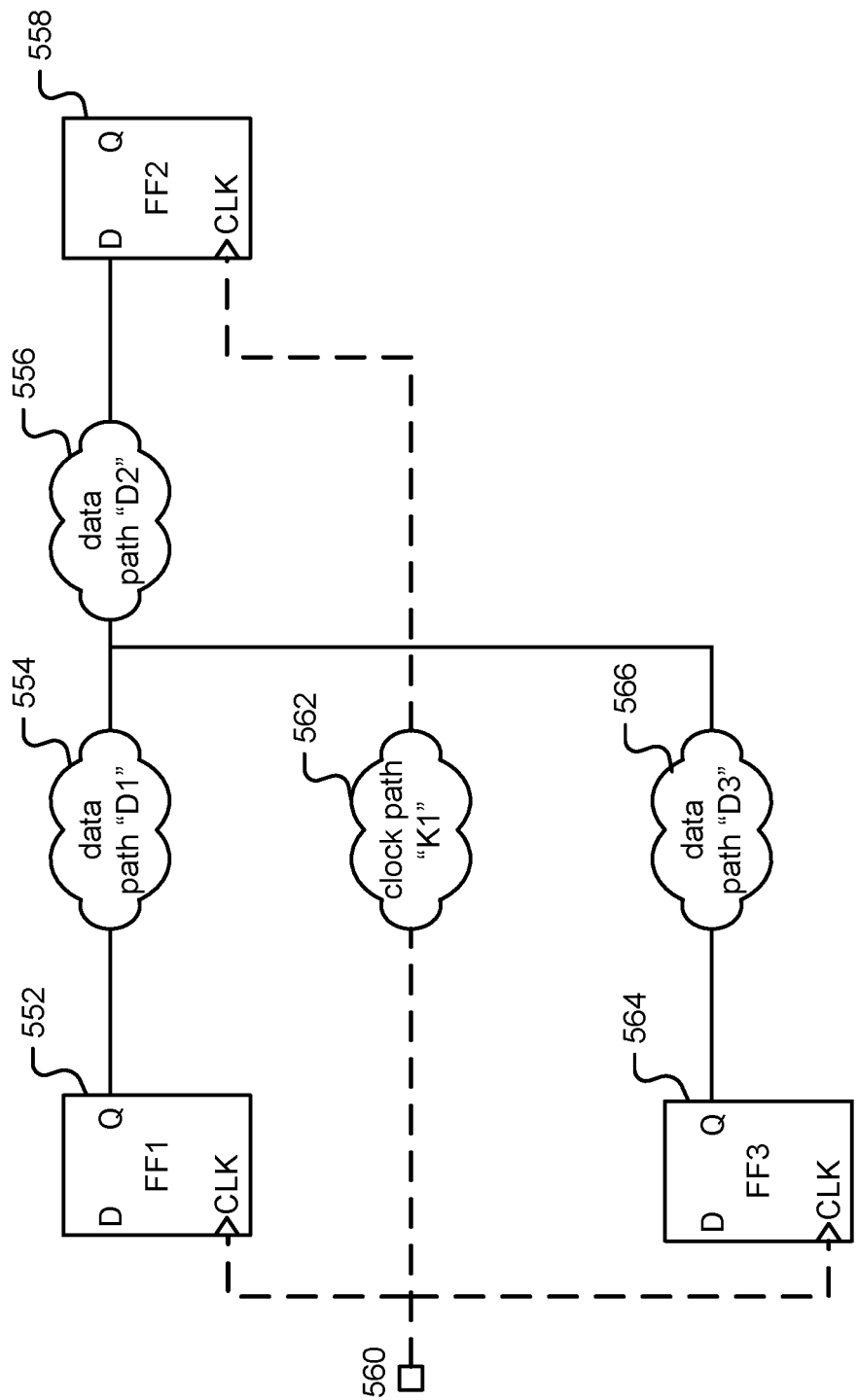
FIG. 5B is a block diagram illustrating an example of arrival timing offset.

In one embodiment, arrival time offset may be calculated for all input pins that exist in PBA database and this arrival time offset used to calibrate GBA timing. Pseudo code for arrival time offset calculation is thus:

Function CalibrateGBATiming( )
  foreach input pin Pi in PBA database do
    if PBA path exists on Pi then
      Get most critical PBA path on Pi;
      Calculate arrival time offset on Pi by equation (4);
    end
  end
  Update GBA timing again with arrival time offsets;
return FIG. 5B is a block diagram illustrating an example of arrival timing offset. The example of FIG. 5B illustrates a more complex example than that of FIG. 5A. FIG. 5B depicts three D-flipflops, FF1 (552), FF2 (558), and FF3 (564). Data path/logic "D1" (554) and data path/logic "D2" (556) is connected between the Q output of FF1 (552) and D input of FF2 (558). Data path/logic "D3" (566) and data path/logic "D2" (556) is connected between the Q output of FF3 (564) and D input of FF2 (558) The clock line, simplified in FIG. 5B to not show buffers, shows a clock line from the boundary master clock pin (560) to the clock of FF1 (552) and FF3 (564). There is also a clock path/buffer set "K1" (562) between pin (560) and the clock of FF2 (558).

A table of GBA and PBA analysis for the circuit of FIG. 5B might be:

| | GBA | PBA | Notes |
|---|---|---|---|
| WNS {D1, D2} | −200 ps | −150 ps | Improvement of 50 ps |
| WNS {D3, D2} | −100 ps | −80 ps | Improvement of 20 ps |

A simple_slack_difference calibration uses the most critical difference, here a difference of 50 ps for the data path including D1 and D2, and applies that across all circuit paths. While being simple, this is simplistic and may not accurate, for example between D3 and D2:

Simple slack calibration of D1-D2 path transforms −200 ps slack to −150 ps using simple slack difference which is accurate, but
  Simple slack calibration of D3-D2 path transforms −100 ps slack to −50 ps using simple slack difference which is not accurate.

Figure 6A:
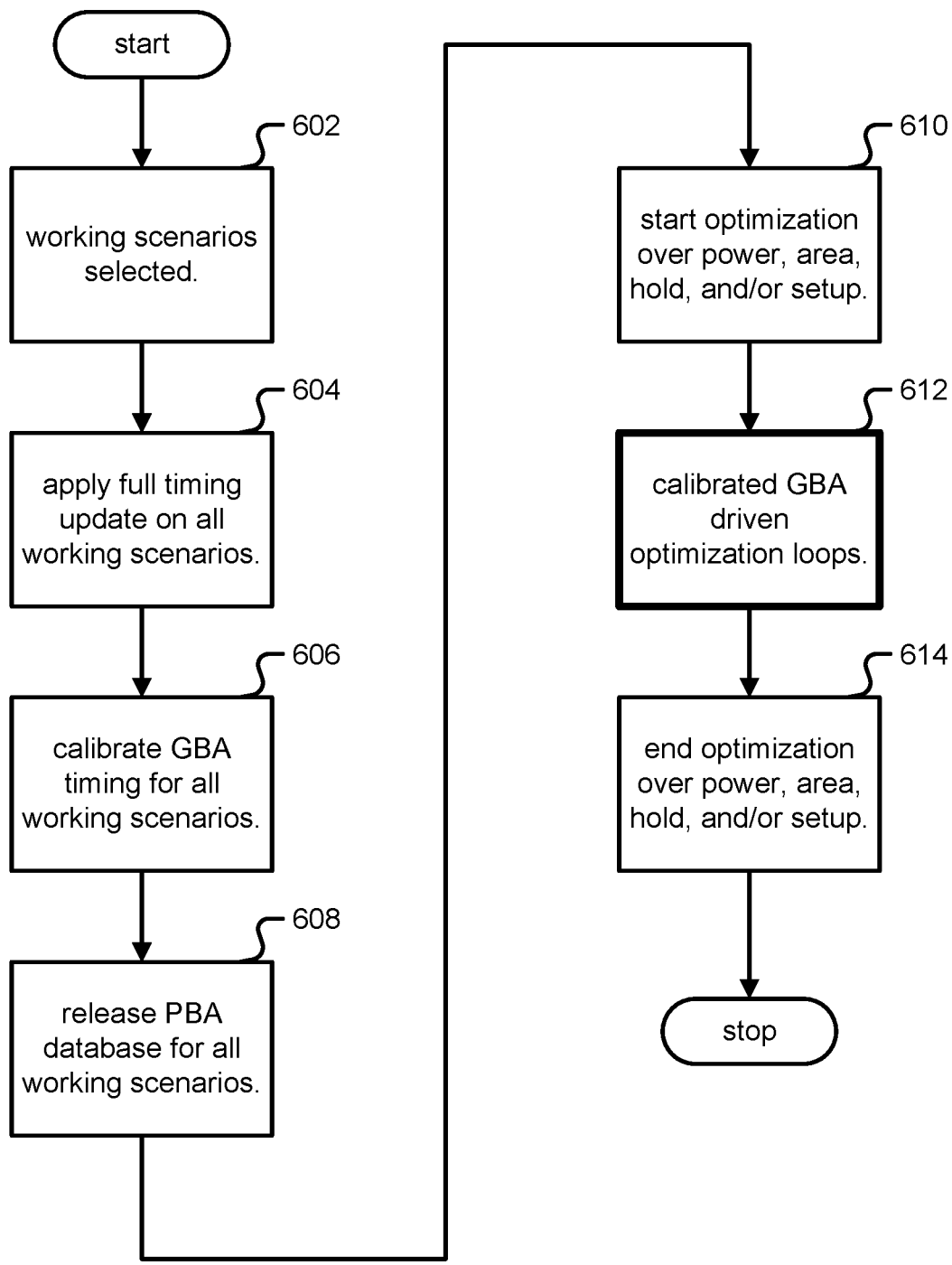
FIG. 6A is a flow chart illustrating an embodiment of a process for a revised PBA-GBA hybrid analysis.

FIG. 6A is a flow chart illustrating an embodiment of a process for a revised PBA-GBA hybrid analysis. In one embodiment, the process of FIG. 6A is carried out by the system of FIG. 1. In step 602, one or more working scenarios are selected for analysis, for example based on an optimization phase. A working scenario may include a critical scenario with certain percentage of QoR coverage. In step 604, a full MCMM GBA and batch PBA timing update is performed as the baseline on all working scenarios selected in step 602. In one embodiment, a PBA-based full timing update is applied on all working scenarios.

In step 606, a GBA calibration is performed on each working scenario by calling a calibration function, such as that described above in equation (4) and/or using pseudocode described above for function CalibrateGBATiming( ). In step 608, PBA databases are now permitted to be released in order to save memory; this may reduce memory burden on the system and/or prevent the explosive memory requirements of traditional techniques/systems.

In step 610, the optimizer is started. In one embodiment, a phase-specific optimization as part of multiphase optimization is used by the optimizer, wherein phase-specific optimization as referred to herein includes at least one of the following: power optimization, area optimization, setup timing optimization, and hold timing optimization. In step 612, calibrated GBA driven optimization loops are iterated as described in FIG. 6B. Afterwards, step 614 indicates the end of the optimizer phase, wherein results may be used to commit an optimization move in the event there is a slack improvement, for example.

Figure 6B:
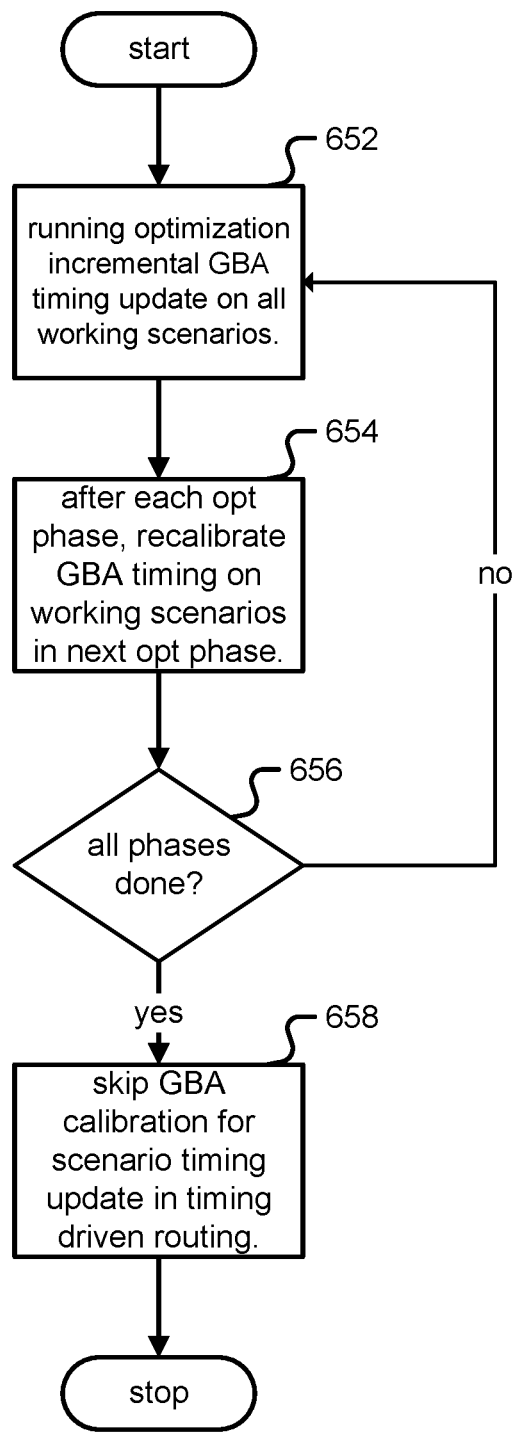
FIG. 6B is a flow chart illustrating an embodiment of a process for a revised PBA-GBA hybrid analysis optimization loop.

FIG. 6B is a flow chart illustrating an embodiment of a process for a revised PBA-GBA hybrid analysis optimization loop. In one embodiment, the process of FIG. 6B is part of step 612 of FIG. 6A and/or carried out by the system of FIG. 1.

In step 652, during optimization merely the calibrated GBA timing results need be incrementally updated for all working scenarios. In step 654, in order to keep timing accuracy, the optimizer repeats a GBA calibration after each optimization phase and before a new optimization phase is run. In step 656, if all phases (except a timing driving routing stage) are not done, control is transferred back to step 652; otherwise, control is transferred to step 658. In step 658, it is recognized that in a timing driven routing stage, there is no need to do calibration because only a full timing update is called. By contrast to step 412 of FIG. 4 using simple slack difference, using the arrival timing offset does not require the large memory requirements of new PBA path updates, and improves upon the simplistic less accurate timing model of the simplified slack difference.

That is, this revised PBA-GBA hybrid flow provides faster analysis speed and lower memory requirements, and may provide similar or even better final power performance area (PPA) compared with traditional flows.

Test Results.

The following table shows experimental results for actual customer designs. After applying an arrival time offset, the calibrated GBA timing is close to PBA timing.

Each row of Table 1 represents a different actual circuit design and shows setup timing comparisons. For each design, the arrival time offset calibration in the fourth column for WNS is closer or equal to the PBA WNS in the third column than the original GBA WNS in the second column. For each design, the arrival time offset calibration in the seventh column for TNS is closer or equal to the PBA TNS in the sixth column than the original GBA TNS in the fifth column.

TABLE 1

Setup timing comparisons

| Design | Original GBA WNS | PBA WNS | ArrOff-Set WNS | Original GBA TNS | PBA TNS | ArrOff-Set TNS |
|---|---|---|---|---|---|---|
| inPhi | −0.212 | −0.103 | −0.096 | −154.217 | −0.849 | −0.786 |
| a5 | −0.223 | −0.207 | −0.207 | −871.785 | −555.055 | −555.055 |
| amcc40 | −0.235 | −0.197 | −0.188 | −154.543 | −32.070 | −55.620 |
| arm1136 | −0.085 | −0.084 | −0.085 | −4.700 | −2.939 | −3.409 |
| azul | −0.246 | −0.246 | −0.240 | −201.084 | −186.336 | −187.709 |
| bcm_mips | −0.187 | −0.174 | −0.176 | −11.550 | −6.064 | −7.439 |
| dongbu | −0.625 | −0.228 | −0.228 | −12.966 | −0.505 | −0.689 |
| enet_top | −0.825 | −0.823 | −0.823 | −81.122 | −78.500 | −78.500 |
| pdsec | −0.130 | −0.124 | −0.124 | −127.095 | −86.041 | −86.041 |
| proc_top | −0.125 | −0.097 | −0.125 | −12.684 | −5.323 | −7.643 |
| sparc | −0.368 | −0.337 | −0.337 | −31.361 | −22.974 | −22.974 |
| ti_uma | −0.541 | −0.249 | −0.535 | −16.322 | −9.023 | −9.311 |

Each row of Table 2 represents a different actual circuit design and shows hold timing comparisons. For each design, the arrival time offset calibration in the fourth column for WNS is closer or equal to the PBA WNS in the third column than the original GBA WNS in the second column. For each design, the arrival time offset calibration in the seventh column for TNS is closer or equal to the PBA TNS in the sixth column than the original GBA TNS in the fifth column.

TABLE 2

Hold timing comparisons

| Design | Original GBA WNS | PBA WNS | ArrOffSet WNS | Original GBA TNS | PBA TNS | ArrOffSet TNS |
|---|---|---|---|---|---|---|
| inPhi | −0.154 | −0.143 | −0.137 | −187.276 | −71.790 | −51.051 |
| a5 | −0.598 | −0.598 | −0.598 | −176.066 | −109.362 | −109.362 |
| arm1136 | −0.282 | −0.271 | −0.281 | −602.351 | −463.798 | −588.170 |
| proc_top | −0.185 | −0.175 | −0.173 | −95.032 | −53.778 | −60.235 |
| sparc | −0.134 | −0.126 | −0.126 | −3.040 | −2.728 | −2.728 |

Table 3 compares design flow results for five actual circuit designs. The initial value for WNS, TNS, and power consumption is given and results are shown for a PBA based PBA-GBA hybrid flow as well as a revised calibrated GBA based hybrid flow using arrival timing offset, along with completion run times and memory requirements.

For each of the five actual circuit designs the hybrid and revised hybrid flow results are similar with much lower run times, in some design cases like N7 cpu requiring only around 7% of the run time, and lower memory requirements, in some design cases like DAC requiring only around a third of the memory.

TABLE 3

Flow results comparisons

| Design | | WNS | TNS | Power | Run time | Memory |
|---|---|---|---|---|---|---|
| cmid | Initial value | −1.627 | −1149.746 | 170.546 | | |
| | PBA driven* | −1.625 | −989.498 | 172.724 | 15:23:10 | 86,905M |
| | GBA driven** | −1.620 | −983.386 | 169.454 | 00:45:54 | 35,446M |

TABLE 3-continued

Flow results comparisons

| Design | | WNS | TNS | Power | Run time | Memory |
|---|---|---|---|---|---|---|
| DAC | Initial value | −0.527 | −444.933 | 335.094 | | |
| | PBA driven | −0.106 | −309.120 | 296.293 | 54:37:25 | 67,165M |
| | GBA driven | −0.108 | −185.854 | 300.466 | 07:00:09 | 22,543M |
| N7_cpu | Initial value | −0.063 | −24.146 | 0.077 | | |
| | PBA driven | −0.042 | −9.004 | 0.064 | 83:03:10 | 124,228M |
| | GBA driven | −0.040 | −7.760 | 0.061 | 06:12:19 | 54,632M |
| cdc_large | Initial value | −0.034 | −44.169 | 42.214 | | |
| | PBA driven | −0.030 | −7.123 | 37.287 | 52:56:52 | 101,479M |
| | GBA driven | −0.026 | −0.948 | 38.837 | 16:17:17 | 57,343M |
| bmy | Initial value | −0.057 | −1.165 | 183.678 | | |
| | PBA driven | −0.056 | −0.841 | 159.156 | 21:48:20 | 127,199M |
| | GBA driven | −0.056 | −0.847 | 158.993 | 03:31:51 | 49,520M |

*PBA based PBA-GBA hybrid flow
**Calibrated GBA based PBA-GBA hybrid flow

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
access a set of multi-corner multimode (MCMM) databases that correspond to a set of working scenarios;
apply a full timing update on the set of MCMM databases, for the set of working scenarios;
perform a graph based analysis (GBA) timing calibration on the databases, for the set of working scenarios to obtain a set of GBA-calibrated databases; and
iteratively perform multiphase optimizations on the set of GBA-calibrated databases to generate a set of optimized databases, including:
performing a phase-specific optimization on the set of GBA-calibrated databases to obtain an improved set of databases; and
recalibrating GBA timing on the set of improved databases prior to a next is phase-specific optimization; and
a memory coupled to the processor and configured to provide the processor with instructions.

2. The system of claim 1, wherein a MCMM database of the set of MCMM databases comprises a graph representation of a circuit design.

3. The system of claim 1, wherein a MCMM database of the set of MCMM databases comprises a graph representation of a circuit design and timing arc information in the graph representation.

4. The system of claim 1, wherein each MCMM database of the set of MCMM databases comprise a netlist.

5. The system of claim 1, wherein the full timing update includes path based analysis (PBA) and GBA.

6. The system of claim 1, wherein the processor is further configured to apply calibration to each of the set of MCMM databases for each of the set of working scenarios.

7. The system of claim 1, wherein the processor is further configured to release a PBA database for a plurality of working scenarios in the set of working scenarios.

8. The system of claim 1, wherein the phase-specific optimization includes a PBA and a GBA.

9. The system of claim 1, wherein the processor is further configured to release a PBA database after the step of recalibrating GBA timing.

10. The system of claim 1, wherein recalibrating GBA timing comprises:
for an input pin in a PBA database, in the event a PBA path exists on the input pin:
determining a most critical PBA path on the input pin; and
calculating an arrival time offset on the input pin; and
updating GBA timing with the calculated arrival time offset.

11. The system of claim 10, wherein calculating the arrival time offset is based at least in part on a difference between PBA and GBA arrival times.

12. The system of claim 10, wherein calculating the arrival time offset is based at least in part on a difference between a difference of PBA and GBA arrival times.

13. A method, comprising:
accessing a set of multi-corner multimode (MCMM) databases that correspond to a set of working scenarios;
applying a full timing update on the set of MCMM databases, for the set of working scenarios;
performing a graph based analysis (GBA) timing calibration on the databases, for the set of working scenarios to obtain a set of GBA-calibrated databases; and
iteratively performing multiphase optimizations on the set of GBA-calibrated databases to generate a set of optimized databases, including:
performing a phase-specific optimization on the set of GBA-calibrated databases to obtain an improved set of databases; and
recalibrating GBA timing on the set of improved databases prior to a next phase-specific optimization.

14. The method of claim 13, wherein the full timing update includes path based analysis (PBA) and GBA.

15. The method of claim 13, further comprising applying calibration to each of the set of MCMM databases for each of the set of working scenarios.

16. The method of claim 13, further comprising releasing a PBA database after the step of recalibrating GBA timing.

17. The method of claim 13, wherein recalibrating GBA timing comprises:
for an input pin in a PBA database, in the event a PBA path exists on the input pin:
determining a most critical PBA path on the input pin; and
calculating an arrival time offset on the input pin; and
updating GBA timing with the calculated arrival time offset.

18. The method of claim 17, wherein calculating the arrival time offset is based at least in part on a difference between PBA and GBA arrival times.

19. The method of claim 17, wherein calculating the arrival time offset is based at least in part on a difference between a difference of PBA and GBA arrival times.

20. A computer program product, the computer program product being embodied in a non-transitory computer readable storage medium and comprising computer instructions for:

accessing a set of multi-corner multimode (MCMM) databases that correspond to a set of working scenarios;

applying a full timing update on the set of MCMM databases, for the set of working scenarios;

performing a graph based analysis (GBA) timing calibration on the databases, for the set of working scenarios to obtain a set of GBA-calibrated databases; and iteratively performing multiphase optimizations on the set of GBA-calibrated databases to generate a set of optimized databases, including:

performing a phase-specific optimization on the set of GBA-calibrated databases to obtain an improved set of databases; and recalibrating GBA timing on the set of improved databases prior to a next phase-specific optimization.

\* \* \* \* \*